UNITED STATES PATENT OFFICE 3,740,441
Patented June 19, 1973

3,740,441
ALPHA-ARYL-N-LOWER ALKYL NITRONE-CONTAINING COMPOSITIONS USEFUL AS ANTI-MICROBIAL AGENTS
Kenneth P. Dorschner, and James A. Albright, Jacksonville, Fla., assignors to SCM Corporation, Cleveland, Ohio
No Drawing. Filed May 3, 1971, Ser. No. 139,867
Int. Cl. A01n 9/20, 21/00
U.S. Cl. 424—327    7 Claims

ABSTRACT OF THE DISCLOSURE

Novel compositions comprising an inert diluent or carrier and an alpha-aryl-N-lower alkyl nitrone are described. The compositions are advantageous in that they have activity over a wide spectrum of phytopathogenic micro-organisms while, at the same time, they are not phytotoxic to selected crop and ornamental plants. Also described are processes for controlling plant pathogens in soil by treatment of the soil or seeds which are to be incorporated in soil.

BACKGROUND OF THE INVENTION

The invention relates to novel compositions which have been found to be particularly effective against soil-inhabiting pathogenic micro-organisms, especially fungi. The compositions are useful in that when applied to soils infested with phyto-pathogenic micro-organisms as amendments to the soil, or when they are applied to seeds before planting, they are highly effective as protective agents and permit normal growth and development of the desired plant species.

The lack of phytotoxicity of these compositions permits treatment of the seeds of plant species, the seeds of which are normally highly sensitive to the conventional mercurial fungicides; for example, the seeds of crop plants such as corn and peanuts. These compositions were highly beneficial since these same compositions control plant pathogens normally controlled with mercurial fungicides.

THE PRIOR ART

Alpha-aryl-N-lower alkyl nitrones are known compounds and have been used as intermediates in synthetic organic reactions. Compounds falling within this class often undergo molecular rearrangement when exposed to long wave ultraviolet light. However, utility of this class of compounds in pesticidal applications has not, to the best of applicants' knowledge and belief, been known before the present invention.

The closest prior art known to the applicants including the author's name, journal, and Chemical Abstracts reference of the prior art publication is set forth in form PO–1082 (11–69) attached hereto.

In its broadest aspect, the invention provides a composition comprising:
(a) An inert carrier, and
(b) An anti-microbially effective amount of an alpha-aryl-N-lower alkyl nitrone where the alpha-aryl group is substituted or unsubstituted.

In an advantageous embodiment the invention provides a composition comprising:
(a) An inert carrier, and
(b) An anti-microbially effective amount of a compound of the formula:

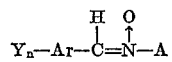

where Y is a substituent selected from the group consisting of halogen, hydroxyl, lower alkoxy, lower alkyl, and nitro-, $n$ is an integer of from 0 to 5, Ar is phenyl, and A is lower alkyl. Such compositions, when used to contact soils contaminated with micro-organisms which are pathogenic to cultivated plants or when used to contact seeds of such plants prior to planting the seeds, effectively prevent substantial injury to or killing of plants which are susceptible to attack by such soil-inhabiting micro-organisms, especially fungi.

The compositions of this invention have been found to be effective against a wide spectrum of plant pathogens which damage or kill crop plants such as, for example, cotton, corn, oats, peas, peanuts, soybeans, sugar beets, beets, onions, melons, and the like.

Examples of species of genera which are pathogenic to plants and which are controlled or killed by the compositions of this invention include species of: Rhizoctonia, Thielaviopsis, Pythium, Fusarium, Sclerotium, Aphanomyces, Urocystis, Pyrenochaeta, Glomerella, Helminthosporium, Rhizopus, Aspergillus, Phoma, Ustillago, and the like. Various species of the above-recited genera of organisms are known to cause pre-emergent and/or post-emergent diseases in or on one or more of the above-mentioned crop plants, sometimes causing complete crop destruction and almost always resulting in a severe reduction in crop yield.

The anti-microbial activity of the compositions of this invention is unexpected because most pesticidal agents which are incorporated in soils or on seeds are active against a relatively narrow spectrum of plant pathogens and are frequently phytotoxic at the high dosage required for effective disease control. The compositions of the present invention are substantially non-phytotoxic at levels at which they totally eliminate or control a wide variety of plant pathogens.

In another aspect the invention provides a process which comprises contacting soils containing micro-organisms which are pathogenic to cultivated plants with from about 0.6 to about 100 pounds per acre of the composition falling within the scope of this invention. As will be evident hereinafter from the specific examples, compositions containing compounds falling within the scope of the above-described formula effectively kill or control the growth of a broad spectrum of soil-inhabiting micro-organisms which are pathogenic to plants without substantially adversely affecting the growth of the plant and ultimate crop yield.

In still another aspect, the invention provides a process which comprises contacting at least a portion of the surfaces of seeds of cultivated plants with from about 0.2 to about 4 weight percent, based on the weight of the seeds, of the compositions of this invention, thereby rendering the seeds resistant to attack by soil-inhabiting micro-organisms which are pathogenic to the seeds or young plants.

When seeds are planted in soils, pathogenic micro-organisms often attack the seed embryo and injure or destroy it before it can grow. Also and more often, the micro-organisms attack the plant embryo just after the germination of the seed, killing it or severely impairing its growth and development.

It has presently been found that the compositions of this invention, when applied to at least a portion of the surfaces of seeds, will render them resistant to attack by soil-inhabiting micro-organisms which are pathogenic to the seeds and/or plants thereby rendering the seed and/or the plant which develops from the seed resistant to attack by such micro-organisms. The compounds set forth as one component of compositions falling within the scope of this invention are substituted or unsubstituted alpha-aryl-N-lower alkyl nitrones. Where the aryl group is unsubstituted, the compound is an alpha-phenyl-N-lower alkyl nitrone.

The lower alkyl group attached to the nitrogen atom in the alpha-aryl-N-lower alkyl nitrones advantageously contains from 1 to 4 carbon atoms, and preferably between 1 and 2 carbon atoms for economic reasons.

Specific examples of compounds falling within the scope of compositions containing compounds with unsubstituted aryl groups are as follows:

alpha-phenyl-N-methyl nitrone,
alpha-phenyl-N-ethyl nitrone,
alpha-phenyl-N-propyl nitrone,
alpha-phenyl-N-butyl nitrone, as well as the analogs of such propyl and butyl nitrones.

Compositions containing compounds wherein the aryl groups contains one or more substituents are those in the hereinbefore-designated formula; Y is a substituent selected from the group consisting of halogen, hydroxyl, lower alkoxy, lower alkyl, and nitro-, and $n$ is an integer of from 1 to 5.

Compounds wherein Y is a halogen atom include those containing chlorine, bromine, and fluorine atoms as substituents on the aryl group.

In compounds where Y is a halogen atom, $n$ can be an integer of from one to five. Compounds which have been found to be particularly advantageous where Y is a halogen atom and $n$ is one, include:

alpha-(2-chlorophenyl)-N-lower alkyl nitrone, where the lower alkyl group contains from one to four carbon atoms;
alpha-(3-chlorophenyl)-N-lower alkyl nitrone; and
alpha-(4-chlorophenyl)-N-lower akyl nitrone, where the lower alkyl is as above described.

These compounds and their corresponding bromo- and fluoro- derivatives have been found to be effective fungicides when employed in the compositions of this invention. Compositions in said compound where Y is a halogen atom and $n$ is two include, for example, alpha-(2,4-dichlorophenyl)-N-lower alkykl nitrone; and alpha-(3,4-dichlorophenyl)-N-lower alkyl nitrone. Compositions containing these compounds and/or their corresponding bromo- and fluoro-derivatives have also been found to be fungicidally effective.

Another effective compound which had been found to provide an advantageous composition is one wherein Y is fluoro- and $n$ is five and specifically is alpha-(pentafluorophenyl)-N-lower alkyl nitrone. Although distinctly different compounds wherein Y is halo- and $n$ is an integer of from one to five may be employed, the hereinbefore-designated specific compounds are generally preferred for economic reasons.

In the above compositions, compounds in which Y is a nitro- substituent have also been found to be useful, and in such compounds $n$ is usually an integer of 1 or 2. Particularly active compositions are those wherein at least one of the following specific compounds are incorporated:

alpha-(2-nitrophenyl)-N-lower alkyl nitrone;
alpha-(3-nitrophenyl)-N-lower alkyl nitrone;
alpha-(4-nitrophenyl)-N-lower alkyl nitrone;
alpha-(2,3-dinitrophenyl)-N-lower alkyl nitrone; and
alpha-(2,4-dinitrophenyl)-N-lower alkyl nitrone.

The compositions can also contain compounds in which Y in the formula is a hydroxyl substituent and $n$ is an integer of from 1 to 5. Of these compounds, those wherein $n$ is 1 have been found preferable for economic reasons. Embodiments of such compounds are:

alpha-(2-hydroxy phenyl)-N-lower alkyl nitrone;
alpha-(3-hydroxy phenyl)-N-lower alkyl nitrone; and
alpha-(4-hydroxy phenyl)-N-lower alkyl nitrone.

As noted hereinbefore, Y can also be a lower alkyl substituent and can include methyl ethyl propyl and sec-butyl or t-butyl, and alkyl substituent can either be on the 1, 2, or 3 positions of the phenyl group.

Also, as previously noted, Y can be a lower alkoxy group including methoxy, ethoxy, propoxy, butoxy, etc., and such groups can be on the 1, 2, or 3 positions of the phenyl group. Compositions containing compounds where Y is lower alkyl or lower alkoxy are usually those in which $n$ is 1 for economic reasons and for maximum fungicidal activity. However, $n$ can be an integer of from 1 to 5, and is usually an integer of from 1 to 3.

Preferred compositions have been found to be those containing one or more of the classes of compounds set forth hereinbefore, since these have been found to be maximally effective and are substantially free of phytotoxic activity.

It is to be understood, however, that almost any compound, if used in sufficiently high concentrations, behaves as a foreign substance; and in such circumstances will have adverse effects upon seeds or plants. However, compounds falling within the scope of the formula of the compositions of this invention generally are fungicidally effective at levels far below those which are phytotoxic to crop plants.

The inert carrier or diluent which is employed in the compositions of this invention can be any carrier or diluent conventionally used in the agricultural pesticide art with the proviso that the carrier should be inert; that is, it should be incapable of undergoing a chemical reaction with alpha-aryl-N-lower alkyl nitrone in the compositions and should not be harmful to the plant or plants or the seeds thereof.

The carrier can be any one of a variety of organic and inorganic, liquid, solid, or semisolid carriers or carrier formulations conventionally used in the soil treatment or seed treatment products. Examples of organic liquid carriers include volatile liquid aliphatic hydrocarbons, such as pentane, hexane, heptane, octane, etc., and their analogs, as well as volatile liquid aromatic hydrocarbons such as benzene, o-xylene, m-xylene, p-xylene, naphthylene, alpha-methyl naphthylene, beta-methyl naphthylene, etc.

In addition to the above-mentioned volatile liquid hydrocarbons, and often used in conjunction therewith, the carrier can contain conventional surfactants or emulsifying agents, such as, for example, nonionic surfactants embodied by an ethylene oxide condensate of an alkyl phenol or an anionic surfactant embodied by an alkali metal salt of an alkyl benzene sulfonic acid. Such emulsifiers are used to permit the compositions to be dispersed in and diluted with water for end-use application. Conventional volatile aromatic and aliphatic esters, aldehydes, and ketones may also be employed as liquid organic inert diluents; and when so used, are usually in combination with the above-mentioned aliphatic and aromatic hydrocarbons.

Solid carriers which can be employed in the compositions of this invention include finely divided inorganic carriers, such as siliceous minerals including clays; for example, bentonite, attapulgite, fuller's earth, diatomaceous earth, kaolin, mica, talc, and finely divided quartz. Other inorganic carriers which may be employed are synthetically prepared finely divided siliceous materials, such as silica aerogels and precipitated and fume silicas.

Examples of finely divided solid organic materials include: powdered solid, nonionic and anionic surfactants, starch flour, sawdust, casein, gelatin, and the like. The inert carrier, when solid, will usually contain a mixture of finely divided siliceous mineral, advantageously a clay, and one or more surfactants. The kind of inert carrier or diluent employed will depend upon the end use of the composition and nature of the plathogenic organism which it is necessary or desirable to control.

By way of example, where it is desired to treat seeds, the carrier can be a slurried dust or an adherent powder having the alpha-aryl-N-lower alkyl nitrone dispersed therein. On the other hand, where it is desired to employ the composition to contact soils, the composition can be a wettable powder, a liquid spray, or a granular formulation containing the nitrones. Such composition may be applied to the soil directly or may be further diluted with water and applied to the soils as liquid or sprays.

The amount of carrier employed in the compositions of this invention may vary considerably depending upon the intended end use of the composition. When the composition is to be applied to soil the composition should be designed to contain that amount of material which will provide a fungicidally effective amount of composition, usually expressed in pounds per acre of the active material; that is, the alpha-aryl-N-lower alkyl nitrone, to the soil. Further, where the composition is to consist of a water-dispersible formulation which will be further diluted with water for end-use purposes, smaller amounts of inert carrier or diluent will be employed and the diluted composition is also intended to be within the scope of this invention, although it contains water in addition to the hereinbefore-defined inert carrier or diluent. Where the surfaces of seeds are to be treated, a liquid slurry or a powdered composition may be employed and the powdered composition used to dust at least a portion of the surface of the seeds, the composition will usually contain larger amounts of the nitrone compounds, then is the case where a liquid composition is used to atomize the materials onto the surface of the seeds.

For all uses, the compositions of this invention will contain from about 0.5 to about 95 weight percent of at least one of the alpha-aryl-N-lower alkyl nitrones and from about 99.5 to about 5 weight percent of the inert carrier or diluent.

In one of its embodiments, the invention provides a process which comprises contacting soils with from about 0.6 to about 100 pounds per acre broadcast of the compositions of this invention. Although soils which are infested with micro-organisms which are pathogenic to cultivated plants are usually contacted with the composition of this invention, soils which do not contain appreciable quantities of such micro-organisms may be contacted with the compositions to prevent future infestation of the soil.

The contact of the soil can be effected in a variety of ways and will depend upon whether the composition is in liquid or solid form. Where the composition is in liquid form, contact can be effected with a conventional spray apparatus such as those commonly employed in the agricultural pesticide field. If the composition is a finely divided pulverulent granular solid, contact can be effected much in the same way as is employed when fertilizers are applied. In fact, the inert carrier may be a fertilizer as long as its components are inert with respect to the compounds of the compositions of the present invention.

When the compositions of this invention are used to treat at least a portion of the seeds of cultivated plants, the method of contact of the seeds will also depend on whether the composition is in liquid or particulate solid form. By way of example, if the composition is in liquid form, the material can be sprayed on the seeds which can then be tumbled to provide an admixture of the composition with the seeds. On the other hand, if the material is in particulate form, the composition may be mixed with the seeds, preferably by tumbling for a time sufficient to insure intimate contact of the composition particles with the seeds.

The amount of composition which may be employed to contact the soil can vary widely depending on the amount in kinds of plant pathogens which are in the soils, as well as the type of soil to be treated. Generally, an amount varying in the range of from about 0.6 to about 100 pounds of composition per acre broadcast will effectively control a wide spectrum of soil micro-organisms. If less than about 0.6 pound per acre is employed, there is some danger that not all of the micro-organisms will be killed. Although more than 100 pounds per acre may be employed, such amounts are economically disadvantageous, and there exists some danger insofar as certain specific plants are concerned of the composition's exerting mild phytotoxicity on the plants.

When seeds are to be contacted, the amount of composition employed will vary from about 0.2 to about 4 weight percent based on the weight of the seeds. The amount of composition employed will depend upon the size of the seeds and, therefore, the surface area thereof; and higher amounts will be employed when the size of the particular plant seed is small, the lower amounts being generally employed where the size of the plant seed is larger. If less than 0.2 weight percent of composition is employed, there is some danger that the seeds will not be adequately protected against attack by plant pathogens. If more than about 4 percent composition is employed, there is some danger insofar as certain plant species are concerned that injury to the plant may occur during the germination of the seeds.

The following specific examples are intended to illustrate the invention, but not to limit the scope thereof, parts and percentages being by weight unless otherwise specified.

EXAMPLE 1

A portion of standard greenhouse soil was conventionally sterilized with methyl bromide and placed into 32 disposable 4-inch-square by 6-inch-deep containers in an amount such that the container was substantially filled with the soil. Thereafter, seven of the containers were inoculated with *Pythium irregulare* by applying a culture of this fungus to the containers and mixing. Another separate set of seven containers was inoculated with *Rhizoctonia solani* using the same procedure. A third set of seven containers was inoculated with *Sclerotium rolfsii* and a fourth set of seven containers was inoculated with *Fusarium oxysporum*. Thereafter, three of the seven containers which had been inoculated with *Pythium irregulare* were treated with 100, 50, and 25 parts per million, basis the weight of the soil, of alpha-(p-chlorophenyl)-N-methyl nitrone. Another set of three containers which had been inoculated with the *Pythium irregulare* fungus was treated with 100, 50, and 25 parts per million, respectively, based on the weight of the soil, with a dispersion of 1-chloro, 2-nitro propane, a commercially available fungicide sold under the trademark of "Lanstan." The remaining single container remained untreated to serve as a control, and a sterilized uninoculated container served as an additional control.

Three of the containers which had been inoculated with the *Rhizoctonia solani* fungus were treated with 100, 50, and 25 parts per million, respectively, with alpha-(p-chlorophenyl)-N-methyl nitrone. A second set of three of the seven containers which had been inoculated with the *Rhizoctonia solani* fungus were treated with 100, 50, and 25 parts per million, respectively, of 1-chloro, 2-nitro propane. The remaining single container remained untreated to serve as an additional control.

Three containers of the set of seven which had been inoculated with the *Sclerotium rolfsii* fungus were treated with 100, 50, and 25 parts per million, respectively, basis the weight of the soil, with alpha-(p-chlorophenyl)-N-methyl nitrone. A second set of three received treatment with the standard material in identical dosages; e.g., 1-chloro, 2-nitro propane. Again, positive and negative controls; that is, inoculated soil and sterile soil, were maintained. Three of the set of seven containers which had been inoculated with *Fusarium oxysporum* were treated with 100, 50, and 25 parts per million, respectively, basis the weight of the soil, of the alpha-(p-chlorophenyl)-N-methyl nitrone. Three of the set of seven which had been treated with the *Fusarium oxysporum* fungus were comparably treated with the standard 1-chloro, 2-nitro propane as previously described.

The positive and negative controls were also maintained. Mycelial growth of the fungi was observed daily for 14 days, after which the surface area of the soil which was covered by mycelial growth was measured. The results showed that the alpha-(p-chlorophenyl)-N-methyl nitrone was about equal in controlling fungal growth of Sclerotium rolfsii and Fusarium oxysporum to the standard 1-chloro, 2-nitro propane at levels given and was also about equal with respect to Pythium irregulare. The nitrone had about the same effectiveness as the standard control in controlling Rhizoctonia solani.

When the same quantities of inoculated soils using the procedures above described are treated with alpha-(p-chlorophenyl)-N-ethyl nitrone, alpha-(p-chlorophenyl)-N-propyl nitrone, alpha-(3 - chlorophenyl)-N-methyl nitrone, alpha-(p-bromophenyl)-N-methyl nitrone, alpha-(2-nitrophenyl) - N-methyl nitrone, alpha-(2,3-dinitrophenyl)-N-ethyl nitrone, and alpha-(2-hydroxyphenyl)-N-ethyl nitrone substantially the same results are obtained.

EXAMPLE 2

The soil sterilization and inoculation procedures of Example 1 were repeated, except that nine instead of 32 containers were filled with sterile greenhouse soil and inoculated with a culture of the organism Pythium irregulare. Just prior to the inoculation, 10 English pea seeds were planted in each container. Thereafter, four of the nine containers were treated with 100, 50, 25, and 12.5 parts per million, respectively, based on the weight of the soil, with alpha-(p-chlorophenyl)-N-methyl nitrone. Also, four of the containers were treated with 100, 50, 25, and 12.5 parts per million, respectively, based on the weight of the soil, with 1-chloro, 2-nitro propane, the commercial standard. One container of sterile soil was also planted with English pea seeds as was an untreated container which had been inoculated with the Pythium irregulare fungus. After 14 days, none of the seeds planted in the untreated inoculated soil produced plants. The sterile soil produced 95 percent of the plants from the seeds. The alpha-(p-chlorophenyl)-N-methyl nitrone was equal to the sterilized control at 100 parts per million, and the commercial product was phytotoxic at this level, in containers dosed at 50, 25, and 12.5 parts per million fungicide. In each instance, the alpha-(p-chlorophenyl)-N-methyl nitrone and the commercial product, 1-chloro, 2-nitro propane, were substantially the same. When the above example is repeated using alpha-(p-methoxyphenyl)-N-ethyl nitrone in place of the nitrone used in Example 2, similar results are obtained.

EXAMPLE 3

The soil sterilization and inoculation procedures described in Example 1 were repeated, except that 21 containers were used in place of the 32 containers used in Example 1. Seven of the containers were inoculated with the fungus Rhizoctonia solani. When the set of seven was inoculated with Sclerotium rolfsii and the third set of seven was inoculated with Fusarium oxysporum just prior to the fungus inoculation, the seven containers that had been inoculated with Rhizoctonia solani were planted with 10 beet seeds in each container. The seven containers which had been inoculated with Sclerotium rolfsii were planted with 10 cucumber seeds in each container, and the seven that had been inoculated with Fusarium oxysporum were planted with 10 tomato seeds in each container. Three of the containers which were inoculated with Rhizoctonia solani were treated with 100, 50, and 25 parts per million, basis the weight of the soil with alpha-(p-chlorophenyl)-N-methyl nitrone and three containers which had been inoculated with Sclerotium rolfsii and three containers which had been inoculated with Fusarium oxysporum were identically treated. Three containers which had been inoculated with Rhizoctonia solani received respectively 100, 50, and 25 parts per million of the 1-chloro, 2-nitro propane, and three containers which had been inoculated with Sclerotium rolfsii, and three containers which had been inoculated with Fusarium oxysporum were similarly treated. The seventh container in each set remained untreated and served as a control. The same amount of beet seeds were planted in a single container of sterile soil for each set and served as a control.

The test showed that the test compound was markedly superior to the commercial standard and in controlling Fusarium oxysporum at inoculation levels of 50 and 25 parts per million, respectively. The test compound and the commercial standard were substantially ineffective in controlling Sclerotium rolfsii and were partially effective in controlling Rhizoctonia solani. In fact, in the case of the Fusarium oxysporum, more tomato seeds permitted and produced healthy plants than was the case in the sterile soil container.

EXAMPLE 4

The sterilization and inoculation procedures described in Example 1 were repeated, except that seven containers were inoculated with cultures of Rhizoctonia solani. Just prior to inoculation, beet seeds which had been mixed with a formulation containing a mixture of 50 percent alpha-(p-chlorophenyl)-N-methyl nitrone and 50 percent attapulgus clay. The treatment levels were 4, 2, and 1 ounce per bushel, respectively. Another portion of seeds were treated with the same concentrations of a formulation containing a mixture of 50 percent attapulgus clay and 50 percent N-trichloromethyl thio 4-cyclohexene, 1,2-dicarboximide, a commercial fungicide sold under the trade name of "Captan."

The results are set forth in the table below and show that the compound alpha-(p-chlorophenyl)-N-methyl nitrone has substantially the same effectiveness at the two higher levels as the standard commercial product. At the lower level, the test product was slightly more effective than the standard.

TABLE I

[Response of a soil fungus to chemicals applied as seed treatments and the influence of these applications on plant stand. Greenhouse.]

| Chemical treatments | Dose, oz./bu. 50% formulation | Plant stand [1] |
| --- | --- | --- |
| α-(p-Chlorophenyl)-N-methyl nitrone | 4 | 88 |
| Do | 2 | 88 |
| Do | 1 | 70 |
| N-trichloromethyl thio-4-cyclohexene, 1,2-dicarboximide | 4 | 88 |
| Do | 2 | 94 |
| Do | 1 | 59 |
| Sterile soil | | 85 |
| Inoculated soil | | 20 |

[1] Percent of sterile soil check Rhizoctonia solani beets.

The soil cultures employed to inoculate the soils in the foregoing examples are prepared and maintained as follows:

The test organisms are raised in sterile soil cultures to which has been added 20 percent, by weight, of cornmeal. The soil to be used for dilution with the cornmeal is separately sterilized with methyl bromide. The pure culture soil used for test purposes is then prepared by admixing 10 percent, by weight, of the test organisms inoculum with 90 percent, by weight, of sterilized soil. The soil is then aliquoted in 50-gram quantities to three replicated containers. Such soil is treated with a chemical by drenching each container with 10 ml. of the nitrone or standard. The chemical concentration is so adjusted to make 10 ml. quantities give a dosage of 100 parts per million, based on the weight of the soil.

In the foregoing examples, the following compounds have been evaluated and substantially the same results were obtained as those specifically set forth in the examples:

alpha-(p-hydroxyphenyl)-N-methyl nitrone
alpha-(p-hydroxyphenyl)-N-ethyl nitrone
alpha-(p-hydroxyphenyl)-N-n-propyl nitrone
alpha-(p-hydroxyphenyl)-N-n-butyl nitrone
alpha-(p-methoxyphenyl)-N-methyl nitrone
alpha-(p-ethoxyphenyl)-N-methyl nitrone
alpha-(p-N-propoxyphenyl)-N-methyl nitrone
alpha-(p-nitrophenyl)-N-methyl nitrone
alpha-(p-nitrophenyl)-N-ethyl nitrone
alpha-(1,3-dinitrophenyl)-N-methyl nitrone
alpha-(p-methylphenyl)-N-methyl nitrone
alpha-(p-ethylphenyl)-N-methyl nitrone.

What is claimed is:
1. A process for controlling fungi in plants which comprises contacting the soil in which said plants grow with about 0.6–100 pounds per acre of an $\alpha$-phenyl-N-$C_{1-4}$ alkyl nitrone of the formula

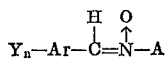

wherein Y is a substituent selected from the group consisting of chloro, bromo, fluoro, hydroxyl, $C_{1-4}$ alkyl, $C_{1-4}$ alkoxy, and nitro; Ar is phenyl; A is $C_{1-4}$ alkyl; and $n$ is 0–2.

2. The process of claim 1 wherein Y is chloro, bromo or fluoro.
3. The process of claim 1 wherein the nitrone is $\alpha$-(p-chlorophenyl)-N-methyl nitrone.
4. The process of claim 1 wherein Y is nitro.
5. The process of claim 1 wherein Y is hydroxyl.
6. The process of claim 1 wherein Y is $C_{1-4}$ alkoxy.
7. The process of claim 1 wherein Y is $C_{1-4}$ alkyl.

References Cited
FOREIGN PATENTS 17,734  7/1968  Japan _____ 424—327

OTHER REFERENCES

Berichte, 57B, pp. 2082–85, 1924.
Chemical Abstracts, vol. 51, item 7343h, 1957.
Bull. Chem. Soc., Japan, vol. 35, pp. 555–62, 1962.
Chemical Abstracts, vol. 59, item 3808g, 1963.
Acta Chem. Scand., vol. 17, No. 7, pp. 2138–39, 1963.
Bull. Chem. Soc. Japan, vol. 36, pp. 1552–63, 1963.

ALBERT T. MEYERS, Primary Examiner

D. ROBINSON, Assistant Examiner

U.S. Cl. X.R.
424—167, 349